United States Patent [19]

Ikeda et al.

[11] Patent Number: 4,851,771
[45] Date of Patent: Jul. 25, 1989

[54] MAGNETIC ENCODER FOR DETECTION OF INCREMENTAL AND ABSOLUTE VALUE DISPLACEMENT

[75] Inventors: Michiaki Ikeda, Onga; Hisayuki Kaku, Kitakyushu; Shinji Yamashita, Kitakyushu; Kenji Hara, Kitakyushu; Hiroyuki Ono, Kitakyushu, all of Japan

[73] Assignee: Kabushiki Kaisha Yaskawa Denki Seisakusho, Kitakyushu, Japan

[21] Appl. No.: 159,745

[22] Filed: Feb. 24, 1988

[30] Foreign Application Priority Data

| Feb. 24, 1987 | [JP] | Japan | 62-39178 |
| Feb. 24, 1987 | [JP] | Japan | 62-39179 |
| Feb. 24, 1987 | [JP] | Japan | 62-39180 |
| Oct. 21, 1987 | [JP] | Japan | 62-263980 |
| Feb. 16, 1988 | [JP] | Japan | 63-34365 |

[51] Int. Cl.$^4$ .......................... G01B 7/14; H01L 43/08
[52] U.S. Cl. .................................... 324/208; 324/252; 307/309; 338/32 R
[58] Field of Search ............... 324/207, 208, 252, 174, 324/173; 307/309; 338/32 R; 360/113

[56] References Cited

U.S. PATENT DOCUMENTS

| 4,274,053 | 6/1981 | Ito et al. | 324/208 |
| 4,319,188 | 3/1982 | Ito et al. | 324/208 |

Primary Examiner—Reinhard J. Eisenzopf
Assistant Examiner—Walter E. Snow
Attorney, Agent, or Firm—Oblon, Spivak, McClelland, Maier & Neustadt

[57] ABSTRACT

A magnetic encoder for detecting the speed of an actuator adapted to carry out rotational movement or linear movement by a magneto-resistor is disclosed. This magnetic encoder is intended to carry out output conversion by using a stripe-shaped magneto-resistor located close to a magnetic medium with respect to a periodic magnetic field coming out of the magnetic medium on which at least one track of magnetization patterns are recorded by a pitch p in order to generate the periodic magnetic field depending on the required position reading accuracy. When the unit stripe length of the magneto-resistor is represented by l and the closest distance between the magnetic medium and the magneto-resistor is represented by g, the angle α defined between the longitudinal direction of the stripe and the surface of the magnetic medium located at the closest part ranges from $$\tan^{-1}\left(\frac{2(l+g)}{p}\right)$$

to 90 degrees and the lateral direction of the stripe is oriented parallel to the direction of the magnetic field from the magnetization patterns.

10 Claims, 16 Drawing Sheets

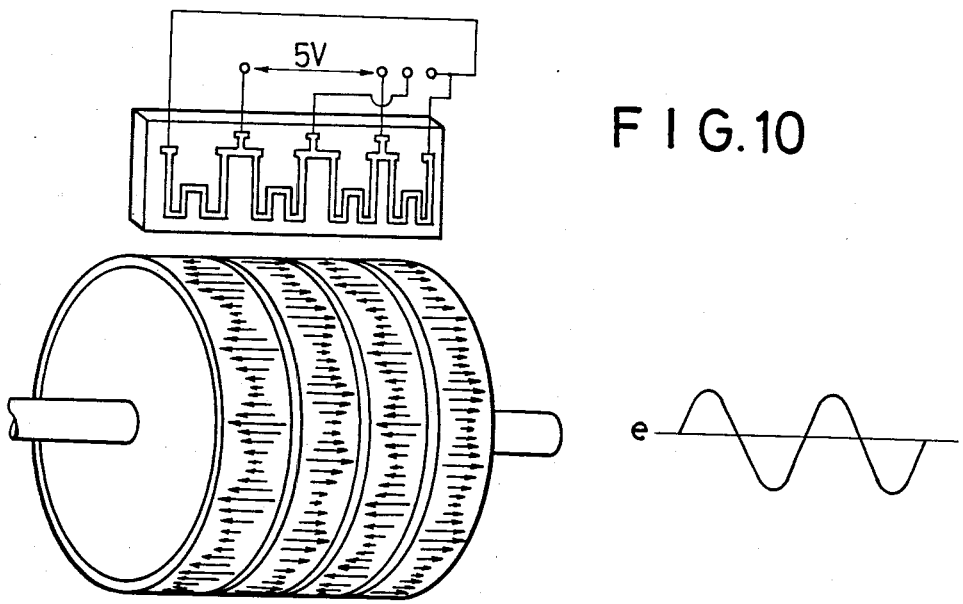
F I G. 10
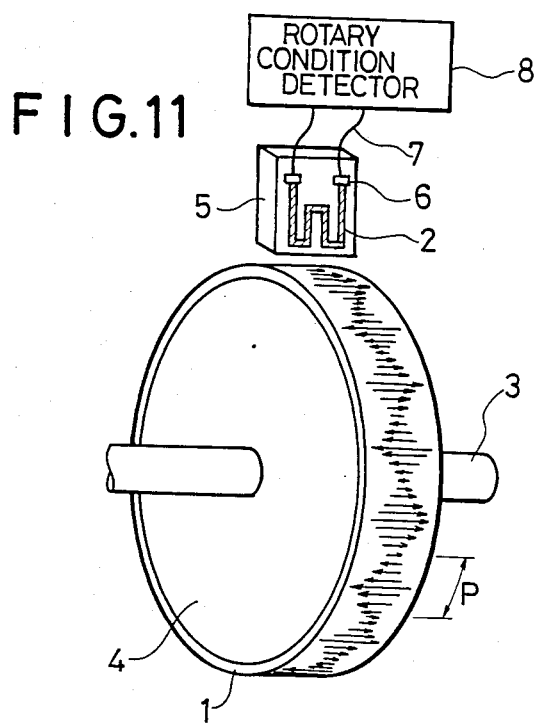
F I G. 11

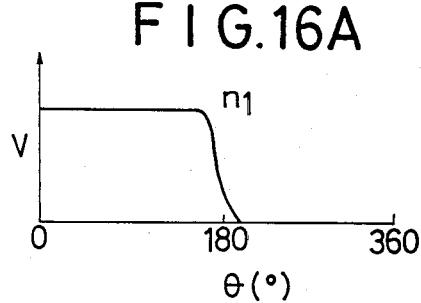
FIG.16A
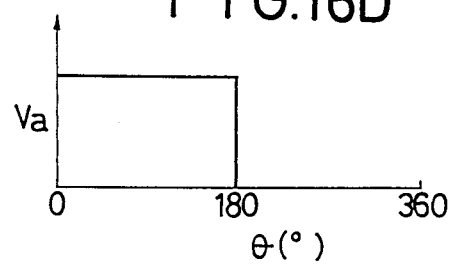
FIG.16D
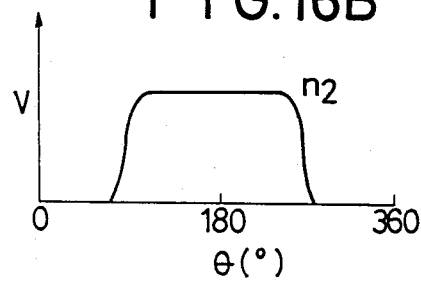
FIG.16B
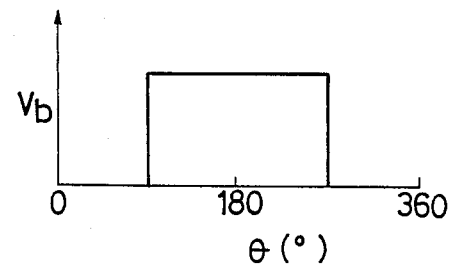
FIG.16E
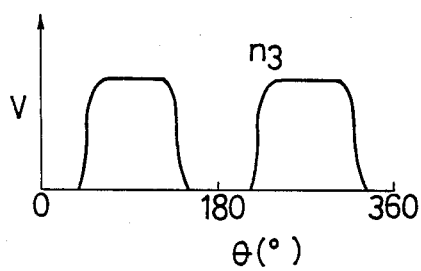
FIG.16C
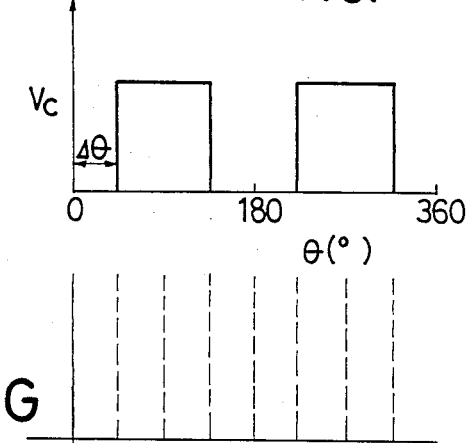
FIG.16F
FIG.16G
| | | | | | | | | |
|---|---|---|---|---|---|---|---|---|
| Va | 1 | 1 | 1 | 1 | 0 | 0 | 0 | 0 |
| Vb | 0 | 0 | 1 | 1 | 1 | 1 | 0 | 0 |
| Vc | 0 | 1 | 1 | 0 | 0 | 1 | 1 | 0 |

ROTARY ANGLE (°)

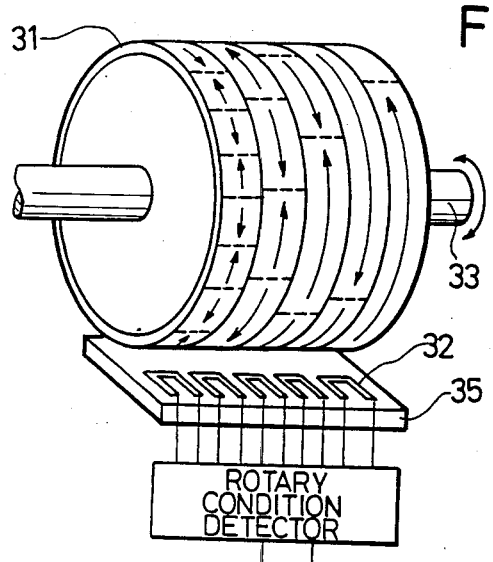
F I G. 31A
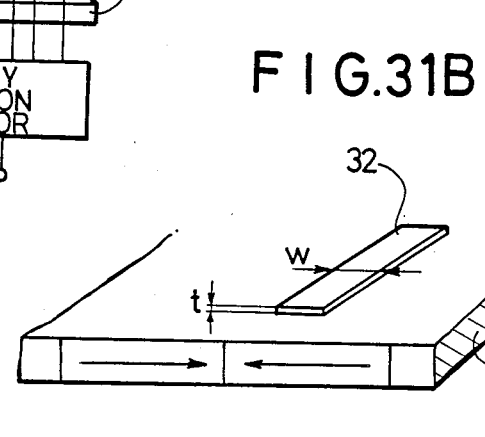
F I G. 31B
F I G. 32
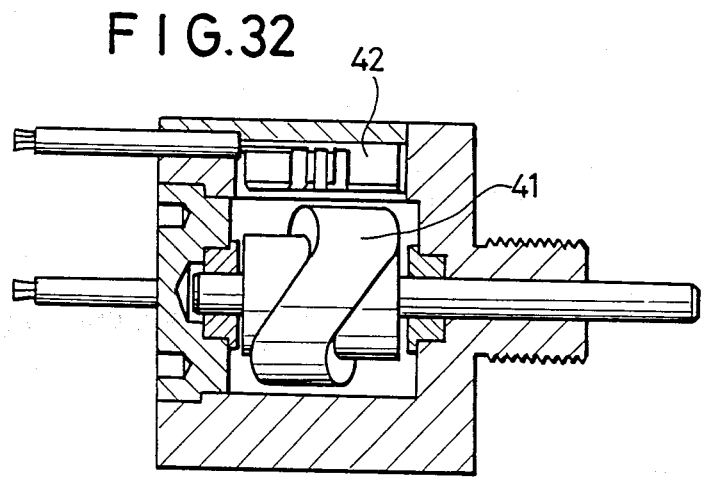

MAGNETIC ENCODER FOR DETECTION OF INCREMENTAL AND ABSOLUTE VALUE DISPLACEMENT

FIELD OF THE INVENTION

The present invention relates to a detector for detecting the speed and the position of a driving and controlling motor usable for robots, manipulators or similar equipment.

DESCRIPTION OF THE PRIOR ART

Requirements for a detector which can instantaneously and accurately measure the position and the speed of an actuator incorporated in robots, manipulators or similar equipment to carry out rotational movement or linear movement have been raised. Heretofore, an optical type detector has been widely used as a detector of the type described above. Since a conventional optical type detector is composed of an photoslit made in accordance with photolithography by vacuum depositing a metallic film on a glass disk, a light emitting diode and a photodiode serving as a light receiving element, it is has drawbacks in that the glass disk is easily broken under the influence of shock imparted thereto, it is impossible to design and construct it in a thin structure for reasons relating to the arrangement of the light emitting element and the light receiving element and, moreover, it cannot be used at a temperature above 80° C.

In recent years there have been seen increased requirements for improving the heat resistance of detectors, for designing and constructing detector in smaller size and for assuring higher resolution thereof, as robot, manipulator and similar equipment are designed and constructed in a smaller size. To meet these requirements, a magnetic encoder in which a drum having magnetic patterns recorded thereon is combined with a magneto-resistor (hereinafter referred to as an MR) was invented (see U.S. Pat. Nos. 4,319,188 and 4,274,053).

The conventional detector as disclosed in prior inventions is composed of an arrangement of a magnetic medium adapted to rotate in association with a rotatable shaft or of an arrangement of a plurality of permanent magnets, an MR for detecting magnetized information recorded on the magnetic medium or for detecting the arrangement of the permanent magnets, and a rotary condition detector for detecting fluctuations in resistance of the MR and then outputting them. To allow the absolute value of the rotation angle to be read, there are provided a number of track of magnetic pattern or there are arranged a number of permanent magnets, i.e., information tracks each of which has an MR allocated thereto.

To facilitate understanding of the conventional magnetic encoder, the latter will be described below with reference to FIGS. 31A to 32. FIG. 31A is a perspective view of a conventional magnetic encoder, particularly illustrating the structure thereof, and FIG. 31B is an enlarged fragmental perspective view of the MR portion in the magnetic encoder shown in FIG. 31A. When a magnetic field $H_{ex}$ is applied to MR 32 from a magnetic medium 31 of the magnetic encoder as constructed in the above-described manner, a magnetic field $H_{eff}$ entering into the MR 32 is represented as follows, when a demagnetizing field is identified by $H_d$ (see Japanese Patent Laid-Open No. 197885/1982):

$$H_{eff} = H_{ex} - H_d$$

Here, when the pattern width of each of the MR 32 is identified by W, a film thickness is identified by t and the intensity of saturated magnetization of the MR 32 is identified by $I_s$, the following equations are established:

$$H_d = 4\pi I_s \cdot \frac{t}{W}$$

Accordingly, $$H_{eff} = H_{ex} - 4\pi I_s \cdot \frac{t}{W}$$

This means that when the pattern width W decreases, the demagnetizing field $H_d$ becomes larger and the magnetic field $H_{eff}$ becomes smaller, whereby reduction of the output from the MR 32 takes place. Since twice the pattern width W is usually considered as the position reading unit, the conventional magnetic encoder has a position reading unit of 20 microns in view of the fact that it has a critical pattern width of 10 microns because it is constructed in the above described manner. Thus, it cannot meet the requirement for fewer microns. Further, due to the fact that there is a need to reduce the stripe length of each of the MR 32 to the minimum level of 2 mm in order to prevent them from being heated, it follows that the conventional magnetic encoder as illustrated in FIGS. 31A and 31B has a drum thickness greater than 10 mm. Although the stripe may of course be folded, this causes the resolution to be reduced correspondingly. Further, since fluctuations in an output is sensitively affected by fluctuations in the distance (spacing) g between the MR 32 and the magnetic medium 31, it is necessary that mechanical finishing of the drum and fitting of the MR 32 be achieved with high accuracy in order to reduce fluctuations in the distance g as much as possible.

However, since this conventional encoder is difficult to be designed and constructed in a smaller size, has a problem relative to dimensional accuracy and, moreover, has a large number of leads extending from the MR 32, there arises a problem relative to arrangement of the leads. To obviate the problems inherent to the above-described conventional magnetic encoder, another magnetic encoder of the same type using MR was developed wherein it had a smaller number of leads and was designed and constructed in a smaller size with reduced weight (Japanese Patent Laid-open No. 24110/1987).

The latter conventional magnetic encoder is composed of a rotary yoke type magnetic member 41 having a curved contour as shown in FIG. 32 and an MR 42 disposed around the peripheral surface of the magnetic member 41 with a predetermined distance kept therebetween. A characterizing feature of this magnetic encoder consists in that as a magnetic field entering into the MR 42 varies depending on its rotational position (due to the curved contour of the magnetic member 41), the output value varies correspondingly. The stripe of the MR 42 has a longitudinal direction which is oriented in alignment with the direction of rotation of the magnetic member 41 and the surface of the MR is arranged parallel to the surface of the magnetic member. Since the magnetic encoder is constructed in the above-described manner, working accuracy and assembling accuracy of parts constituting the magnetic encoder become important in order to assure that the distance between the whole MR 42 and the magnetic member 41 is maintained constant, resulting in the magnetic encoder becoming expensive. Further, because the MR is disposed on a curved surface, it becomes increasingly difficult to produce the magnetic encoder as the latter is designed and constructed in a smaller size. Also with respect to the rotary type magnetic member 41 having a curved contour, its accuracy in shape is related to accuracy in output of the MR 42, causing production of the magnetic member 41 to become similarly difficult. Moreover, with respect to the characteristics of the magnetic encoder, the latter is readily affected by fluctuation in spacing.

SUMMARY OF THE INVENTION

It is an object of the present invention to provide an incremental type magnetic encoder which is easy to produce, is barely affected by fluctuations in spacing, is designed and constructed in a smaller size with reduced weight, and can satisfactorily meet the requirement for a higher of resolution.

It is another object of the present invention to provide an absolute type magnetic encoder which can satisfactorily meet the requirement for a higher resolution and, moreover, has fewer fluctuations in output in response to fluctuations in distance between an MR and a magnetic medium.

To accomplish the above objects, the present invention provides a magnetic encoder of the type adapted to carry out output conversion with the use of a stripe-shaped magneto-resistor located close to a magnetic medium with respect to a periodic magnetic field generated from the magnetic medium on which at least one track of magnetization patterns are recorded by a pitch p so as to generate the periodic magnetic field depending on a required position reading accuracy, wherein when one unit stripe length of the magneto-resistor is represented by l and the closest distance between the magnetic medium and the magneto-resistor is represented by g, the angle $\alpha$ defined between the longitudinal direction of the stripe and the surface of the magnetic medium located at the closest part ranges from $$\tan^{-1}\left(\frac{2(l+g)}{p}\right)$$

to 90 degrees and the lateral direction of the stripe is oriented parallel to the direction of the magnetic field from the magnetization patterns.

These and other objects, features and advantages of the present invention will become readily apparent from the following description which is made with reference to the accompanying drawings.

BRIEF DESCRIPTION OF THE DRAWINGS

The present invention will be illustrated by the following drawings.

FIGS. 8 to 10 are schematic perspective views of other embodiments of an incremental type magnetic encoder in accordance with the present invention.

FIG. 11 is a schematic perspective view of the second embodiment of an incremental type magnetic encoder in accordance with the present invention.

FIGS. 16A to 16G are diagrams illustrating the relationship between magnetization patterns track $n_1$, $n_2$ and $n_3$ in FIG. 14 and output voltage.

FIGS. 31A, 31B and 32 are schematic views of conventional magnetic encoders.

DESCRIPTION OF THE PREFERRED EMBODIMENT

The present invention will be described in a greater detail hereunder with reference to the accompanying drawings which illustrate preferred embodiments thereof.

Figure 1:
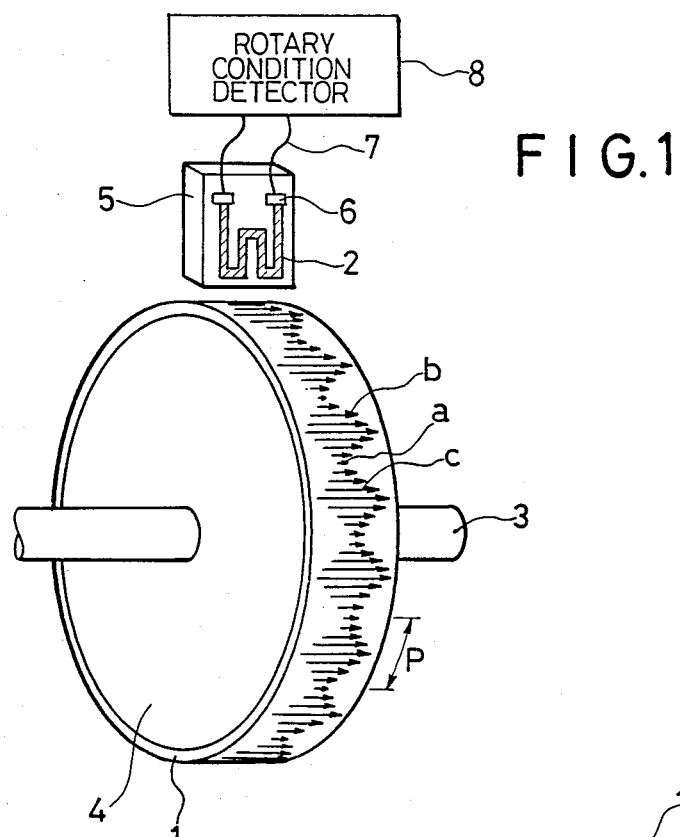
FIG. 1 is a schematic perspective view of a first embodiment of an incremental type magnetic encoder in accordance with the present invention.
Figure 2:
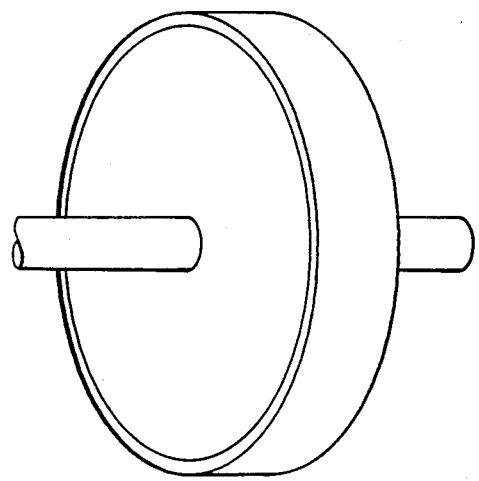
FIG. 2 another schematic perspective view of the magnetic encoder in FIG. 1, particularly illustrating a method of forming magnetization patterns.
Figure 4:
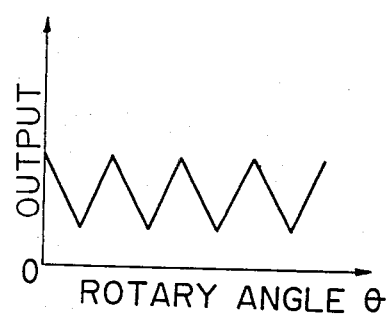
FIGS. 4 and 5 are diagrams illustrating waves of a signal outputted from the magnetic encoder in FIG. 1.
Figure 5:
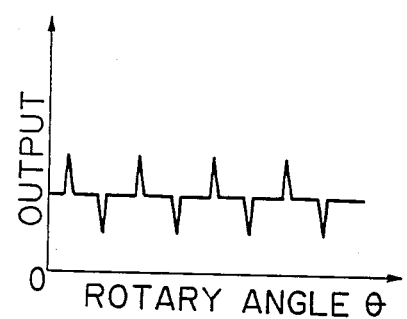

A magnetic encoder in accordance with the first embodiment of the invention as shown in FIG. 1 is composed of a drum 4 made of aluminum alloy and fixedly mounted on a rotatable shaft 3, a magnetic medium 1 of Co- $\gamma$ Fe$_2$O$_3$ formed on the periphery of the drum 4, a detecting head comprising an MR 2 formed by a film of 81Ni-Fe on a substrate 5 made of glass and terminals 6 formed by a film of Cu, leads 7 connected to the terminals 6, and a rotary condition detector 8. The arrows shown on the magnetic medium 1 represent the intensity of magnetization and magnetization has been effected with the use of a ring head 9 with a coil 10 attached thereto as shown in FIG. 2, while a current is caused to flow through the coil 10. The intensity of magnetization varies within a single pitch p. If the magnetic encoder as constructed in the above-described manner, variations in resistance of the MR 2 is caused in response to the intensity of the magnetic field leaking out of the magnetic medium 1, and an output signal having a triangular wave shape as shown in FIG. 4 is obtained. When the output signal is modified in the form of a pulse by using the middle value of the output signal as a threshold value, an output signal as shown in FIG. 5 is obtained. This means that the magnetic encoder of the invention can be used as a position detector.

Figure 6:
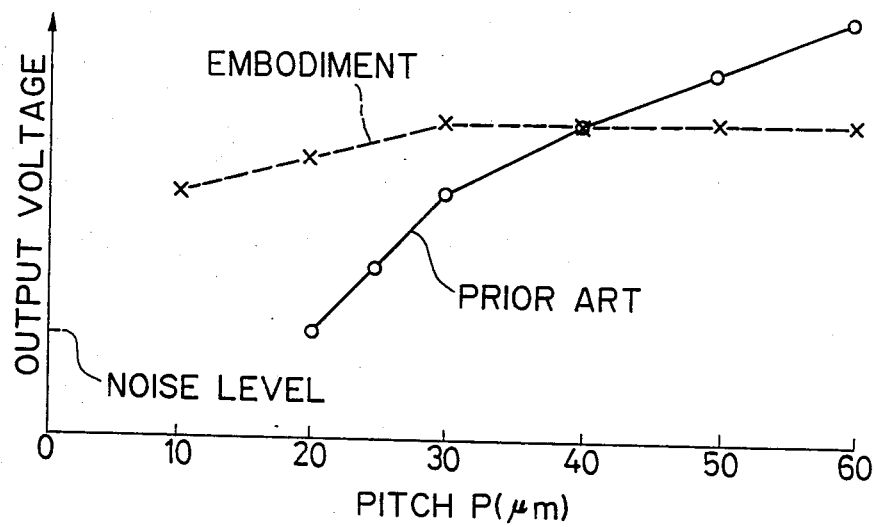
FIG. 6 is a diagram illustrating a comparison between the relationship between pitch p and output voltage with respect to the magnetic encoder in FIG. 1, and with respect to a conventional magnetic encoder.

As will be apparent from FIG. 6, the magnetic encoder of this embodiment can satisfactorily meet the requirement for higher resolution because the output voltage is sufficiently above the noise level even when it has a pitch less than 20 microns which indicates the limit for a conventional magnetic encoder. Further, since the surface of the MR 2 extends at a right angle relative to the surface of the drum 4, there is no fear that breakage takes place due to contact of the MR 2 with the drum 4.

Figure 7:
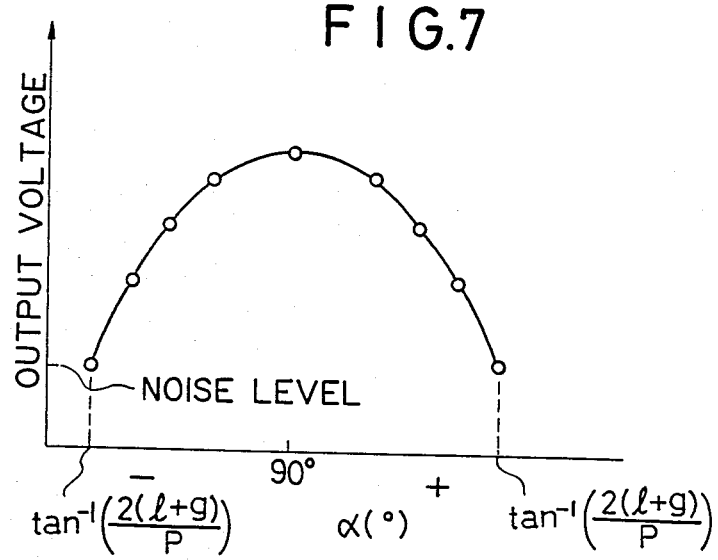
FIG. 7 is a diagram illustrating the effect of the angle defined between the longitudinal direction of MR pattern and the surface of the magnetic medium at the closest part on output voltage.

FIG. 7 is a diagram illustrating the effect of the angle $\alpha$ as defined between the longitudinal direction of a stripe of the MR 2 and the direction of extension of a tangential line on the surface of the magnetic medium 1 on an output value. It has been found that, as the stripe of the MR 2 inclines (i.e. as the value of the angle $\alpha$ deviates from 90 degrees), the output is increasingly reduced and it reaches a noise level at an angle of $$\alpha = \tan^{-1}\left(\frac{2(l+g)}{p}\right).$$

Figure 3:
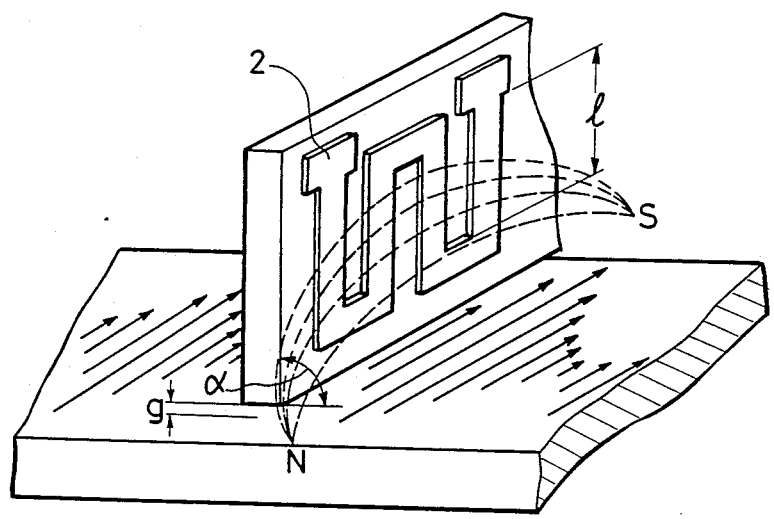
FIG. 3 is an enlarged fragmental perspective view of the magnetic encoder in FIG. 1, particularly illustrating magnetization patterns and MR 2.

Here l represents the length of the unit stripe of the MR 2 and g the closest distance between the magnetic medium 1 and the MR 2 (see FIG. 3).

Further, since the lateral direction of the stripe of the MR 2 is oriented parallel to the direction of a track of magnetization patterns and a magnetic field coming from the magnetization pattern is applied in the lateral direction of the stripe, what is affected by a demagnetizing field Hd is the lateral direction of the stripe and the pitch p is not restricted by the width of the stripe. Further, since the pitch p can be reduced irrespective of the width of the stripe, the magnetic encoder of the embodiment can satisfactorily meet the requirement for higher resolution.

Figure 8:
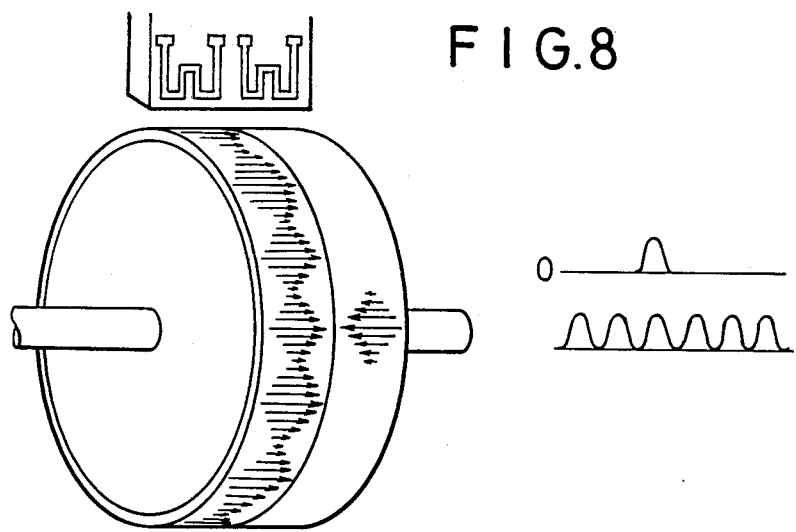
Figure 9:
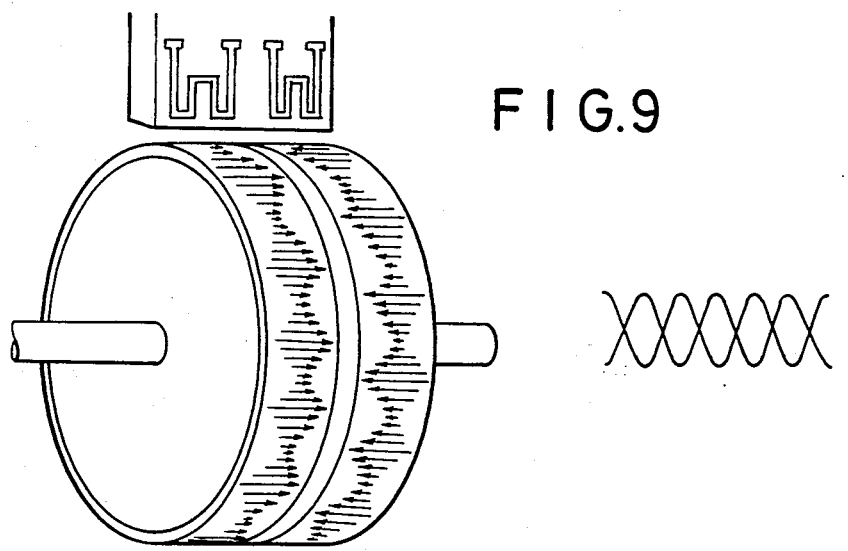

FIGS. 8, 9 and 10 are perspective views of a magnetic encoder in accordance with other embodiments of the present invention. FIG. 8 represents an example where an O point and an incremental phase are formed with the use of a current having the shape of a sine wave, FIG. 9 an example where two tracks of magnetization patterns with a phase difference of 90 degrees provided therefor are arranged and FIG. 10 an example where two tracks are arranged for each of the magnetization pattern track having two different phase differences with the use of a perpendicular anistropy film of Co-Cr to build a bridge so that an output signal is taken therefrom. Any of the above-described embodiments exhibits the same advantageous effect as those obtained with the magnetic encoder as shown in FIG. 6.

Incidentally, a drum is used for the foregoing embodiments of the invention. However, the invention should not be limited thereto. It will be obvious to any expert in the art that the same advantageous effects can be obtained even when a magnetic medium is provided on the surface of the disc.

Next, a second embodiment of an incremental type magnetic encoder in accordance with the present invention will be described.

In the embodiment shown in FIG. 1, the direction of magnetization is identical within a single track of magnetization patterns with the result that a magnetic flux enters from the immediately adjacent pitch parts b and c into a pitch part a at which one pitch is shifted to another pitch as the pitch p decreases. Thus, a magnetic field exerted on the MR is enlarged irrespective of how the intensity of magnetization is, and thereby the difference in output between the a part and the c part or between the b part and the c part disappears, causing higher resolution to be restricted.

Figure 12:
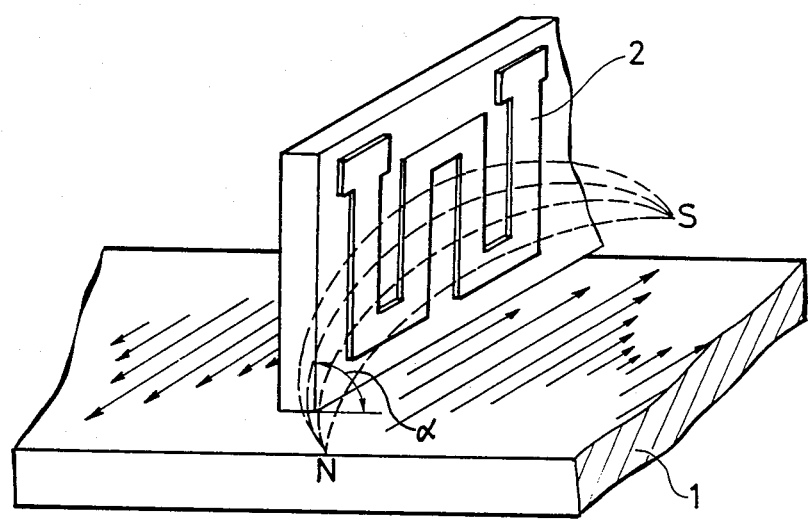
FIG. 12 is an enlarged fragmental perspective view of the magnetic encoder in FIG. 11, particularly illustrating magnetization patterns and MR 2.

The embodiment shown in FIGS. 11 and 12 is practiced with the foregoing problem in mind. In this embodiment, magnetization is effected in such a way that a current flows through the coil 10 with the use of the ring head 9 and is reversed each time the drum 4 is rotated by the angular distance of the pitch p. Consequently, the direction of magnetization within one pitch is opposed to the direction of magnetization within an adjacent pattern.

Figure 13:
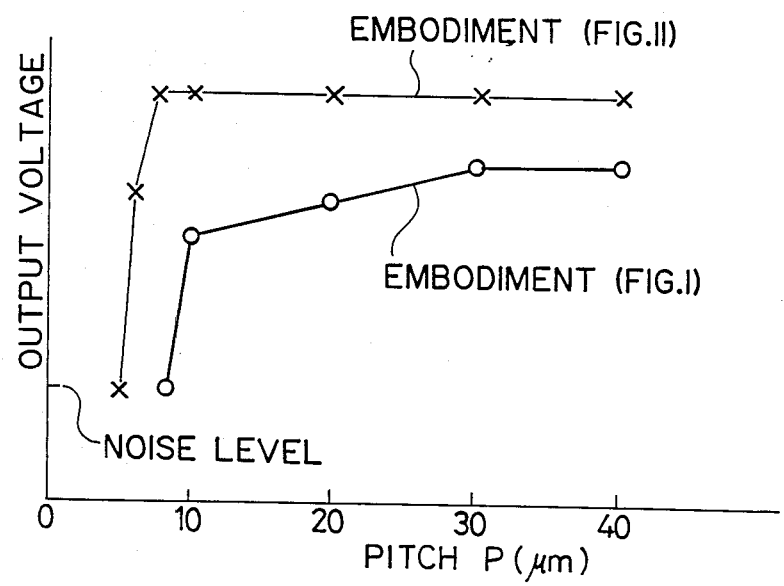
FIG. 13 is a diagram illustrating a comparison made between the relationship between pitch p and output voltage with respect to the magnetic encoder in FIG. 11 and that with respect to the first embodiment.

As will be apparent from FIG. 13, this embodiment assures that the output voltage is sufficiently above the noise level even when the magnetic encoder has a pitch less than 10 microns which represents the limit for the first embodiment, because the magnetic field on the boundary portion of adjacent pitches within a single track becomes zero due to counter directions of magnetic fluxes on the portion. Moreover a high output is obtained. Accordingly, it is possible to satisfactorily meet the requirement for higher resolution. Incidentally, it is obvious that the same effects can be obtained as in the first embodiment even when the distribution of intensity of magnetization within an area as defined by a single pitch exhibits a triangular wave shape or a sine wave shape in the same manner as the magnetic encoder in FIG. 1.

Figure 14:
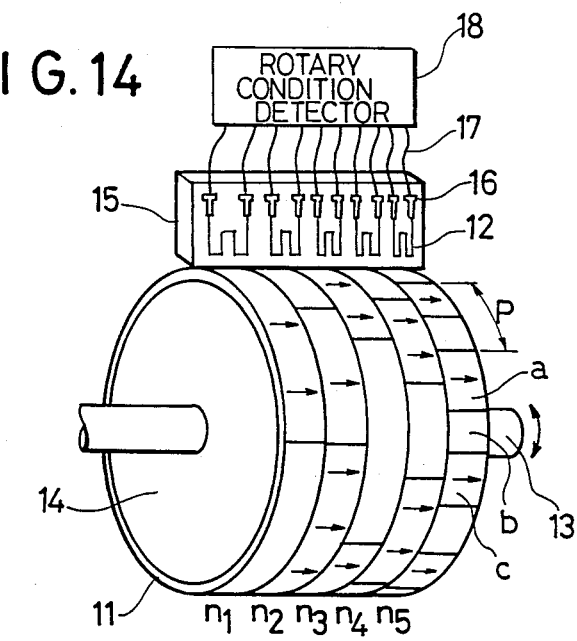
FIG. 14 is a schematic perspective view of an embodiment a digital and absolute type magnetic encoder in accordance with the present invention.
Figure 15:
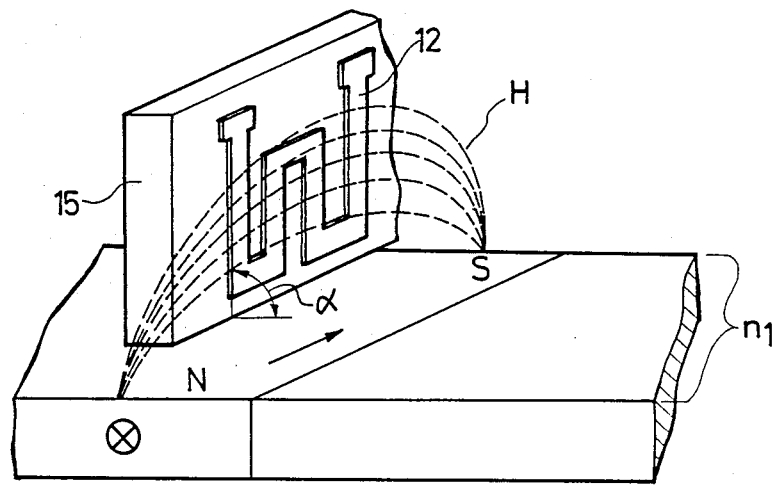
FIG. 15 is an enlarged fragmental schematic perspective view of the magnetic encoder in FIG. 14, particularly illustrating that a leakage magnetic field H leaking out of a magnetization pattern intersects MR patterns at a right angle.

A magnetic encoder in accordance with another embodiment of the invention as illustrated in FIG. 14 is composed of a drum 14 fixedly mounted on a rotational shaft 13, a magnetic medium 11 formed on the periphery of the drum 14, a detection head comprising a plurality of MRs 12 formed on a substrate 15 and a plurality of electric conductive terminals 16, a plurality of leads 17 connected to the electric conductive terminals 16, and a rotary condition detector 18 including an output terminal leading to the outside. Five tracks $n_1$-$n_5$ of magnetization patterns are recorded on the magnetic medium 11 by arrows in FIG. 14, and a magnetic field leaking out of the tracks $n_1$ to $n_5$ is exerted onto the corresponding MR 12. Thus, as shown in FIG. 15, a leakage magnetic field H out of the magnetic medium 11 intersects the MR patterns at a right angle, and thereby a variation of resistance, i.e., the output voltage as shown in Figs. 16A, 16B and 16C is obtained with respect to the tracks $n_1$, $n_2$ and $n_3$. Here, when the unit stripe length of the MR 12 is represented by l, the closest distance between the drum 14 and the MRs 12 is represented by g and the position reading unit is represented by p, the angle $\alpha$ defined between the direction of the stripe length of the MR 12 and the tangential direction as seen from the outer surface of the drum 14 ranges from $$\tan^{-1}\left(\frac{2(l+g)}{p}\right)$$

to 90 degrees and the lateral direction of the stripe is oriented parallel to the direction of the tracks $n_1$ to $n_5$, whereby a magnetic field coming from the tracks $n_1$ to $n_5$ is applied in the lateral direction of the stripe. When a voltage close to the substantially middle part between the ascending part and the descending part of the aforesaid output voltage is used as the threshold value and converted in the form of a pulse, it is represented as illustrated in FIGS. 16D, 16E and 16F. Then, by utilizing a combination table (see FIG. 16G) on which a number of pulses are shown, addressing is achieved by using the minimum reading angle $\Delta\theta$ as the unit whereby the absolute position can be known with reference to the pulse output generated at each point. Here, when the number of magnetization pattern tracks is represented by n, the minimum reading angle $\Delta\theta$ is represented as follows:

$$\Delta\theta = \frac{360°}{2^n}$$

Accordingly, when the radius of the drum 14 is represented by r, the minimum bit-length p/2 in the nth track is represented as follows:

$$p/2 = \frac{2\pi r}{2^n - 1}$$

Figure 17:
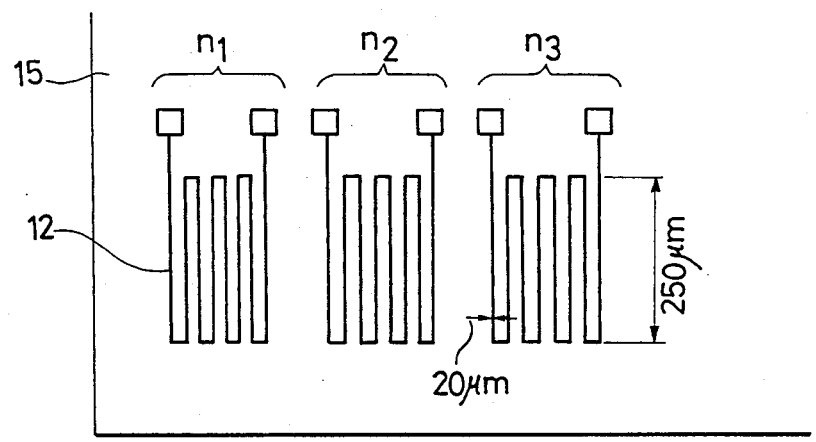
FIG. 17 is an enlarged schematic view of MR 12 in FIG. 14 for the encoder in FIG. 14.
Figure 18:
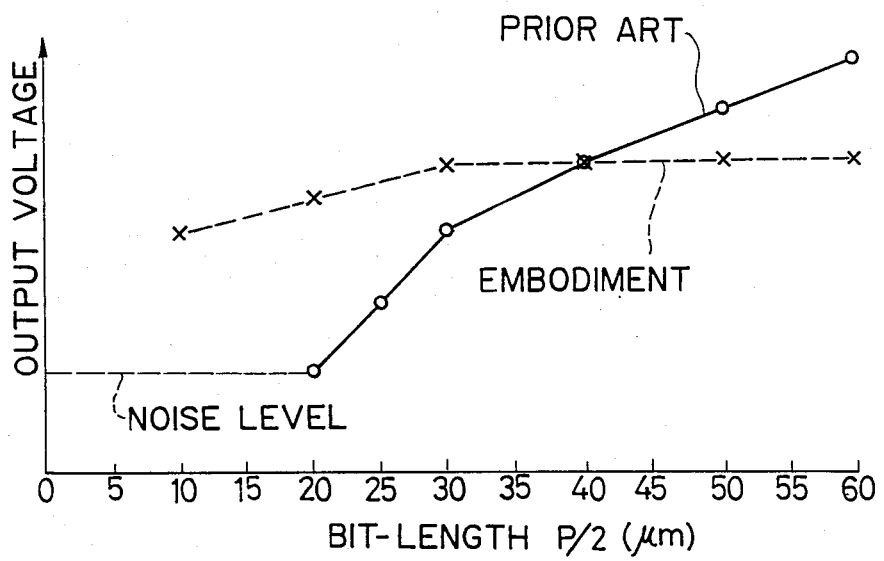
FIG. 18 is a diagram illustrating a comparison between the relationship between output voltage and pitch p/2 with respect to the magnetic encoder in FIG. 14 and with respect to a conventional magnetic encoder.

A drum made of aluminum alloy having a diameter of 20 mm and a thickness of 8 mm with a film of Ba-ferrite having a thickness of 100 microns coated on the outer peripheral surface thereof was produced, and a plurality of magnetization pattern tracks having various bit-length p/2 were formed with the use of a magnetizing head. A single magnetization pattern track had a width of 300 microns. Formation of a pattern having a width of 20 microns and a length of 250 microns as shown in FIG. 17 was folded four times in association with the drum, and the relationship between the output length and the bit-length p/2 was then examined with the aid of a combination of the drum with an MR sensor having an overall length of 2.2 mm. The sensor had a film thickness of 600 angstroms. As will be apparent from FIG. 18, it is possible to assure that the magnetic encoder in accordance with this embodiment satisfactorily meets the requirement for higher resolution because of the fact that its output voltage is sufficiently above the noise level even when the magnetization pattern column has a width less than 20 microns which is indicative of the limit for a conventional magnetic encoder. Since an MR sensor usually has a thickness of 600 angstroms, the magnetic encoder as constructed in accordance with the embodiment provides a limit to the minimum bit-length which is about twice the thickness of the MR sensor. Further, since the magnetic encoder has the same resolution irrespective of how many times formation of an MR pattern stripe is repeated, as long as it is constructed in the above-described manner, the result is that the magnetic encoder in accordance with the embodiment has a magnetization pattern track width of 250 microns which is equal to about one-eighth of 2 mm for a conventional magnetic encoder. Thus, the magnetic encoder may have a reduced magnetization pattern column width when the width of the MR pattern is reduced. In other words, the magnetic encoder can be designed and constructed in a smaller size.

Figure 19:
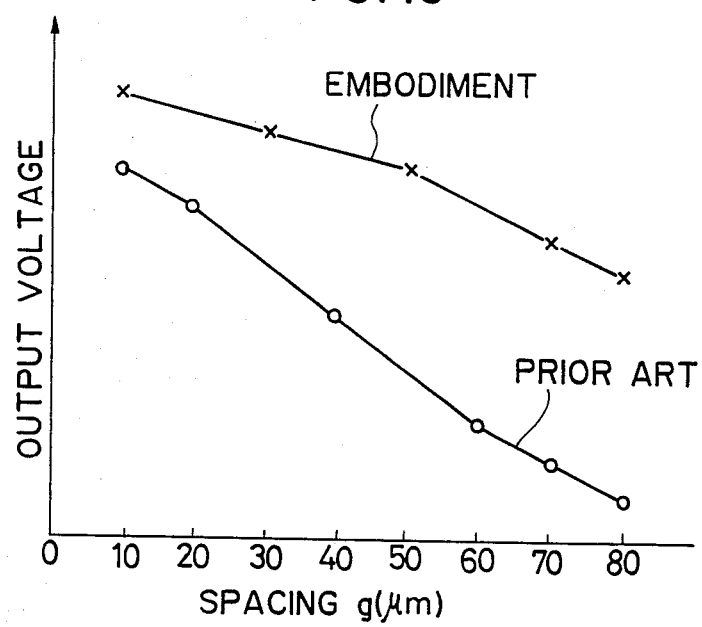
FIG. 19 is a diagram illustrating a comparison between the relationship between output voltage and spacing with respect to the magnetic encoder in FIG. 14, and with respect to a conventional magnetic encoder.

Next, a comparison was made between the effect of the distance g between the drum and the sensor on a output value provided by the magnetic encoder of the invention and that provided by a conventional magnetic encoder. Results of the comparison are shown in FIG. 19. Because fluctuations in output is small compared with variations in the distance g, the allowable range of the distance g can be widened with the result that there is no need to strictly control the degree of finishing for the drum and the accuracy relative to fitting of the MR sensor.

Figure 20:
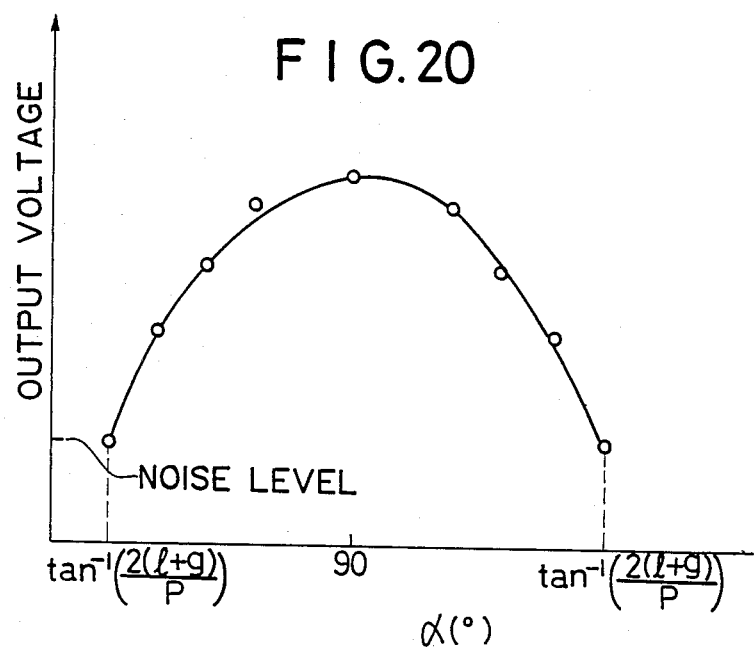
FIG. 20 is a diagram illustrating the relationship between output voltage and angle of $\alpha$ with respect to the magnetic encoder in FIG. 14.

The effect of the angle $\alpha$ as defined between the surface of the magnetic medium and the longitudinal direction of the pattern of the MR on an output value of the magnetic encoder was examined, and the results as shown in FIG. 20 were obtained. It will be obvious from the drawing that, as the MR inclines, the output is reduced and it reaches a noise level at an angle of $$\alpha = \tan^{-1}\left(\frac{2(l+g)}{p}\right)$$

and the range of the angle α as represented by $$\tan^{-1}\left(\frac{2(l+g)}{p}\right) < \alpha \leq 90$$

degrees is acceptable.

Since the pitch of each of the magnetization patterns is oriented in the direction of rotation, the lateral direction of the MR is oriented in the direction of magnetization patterns, whereby a magnetic field is applied in the lateral direction of the stripe, it follows that the magnetic field is not affected by a demagnetizing field, that the pattern width can be reduced and also that the pitch p is not restricted by the pattern width W. Further, since the stripe may be folded at the same bit position (on the same track), the width of the magnetization pattern track can be narrowed without any reduction of resolution.

Figure 21A:
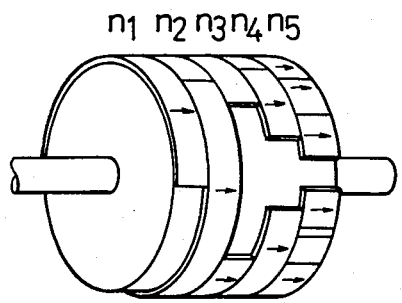
FIGS. 21A to 21D are perspective views of other embodiments of a magnetic encoder in accordance with the present invention.
Figure 21B:
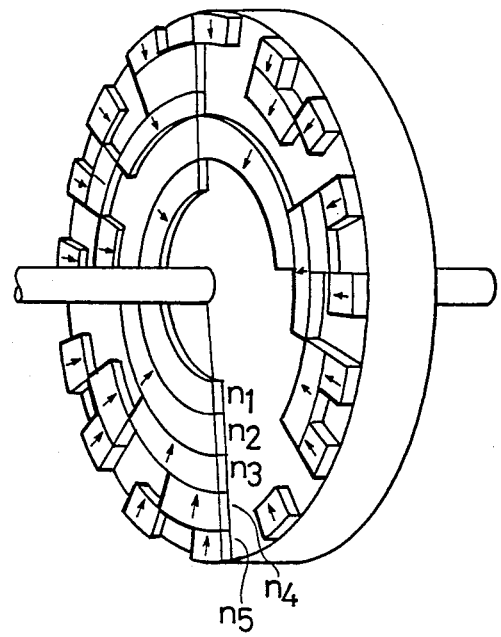
Figure 21C:
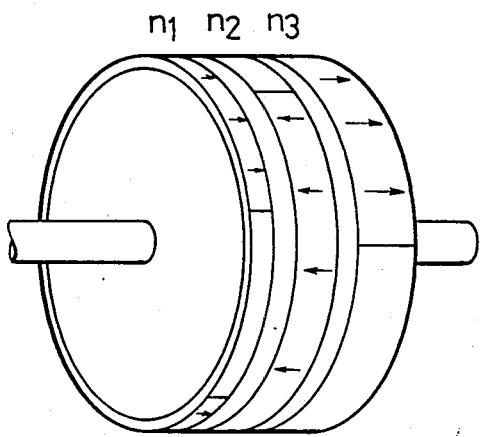
Figure 21D:
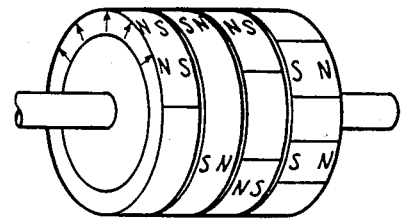

FIGS. 21A-21D are perspective views of a magnetic encoder in accordance with other embodiments of the invention. FIGS. 21A and 21B illustrate examples where a plurality of Fe-Co-Cr permanent magnets are adhesively attached to the drum and the disc, FIG. 21C an example where a non-magnetized portion is provided between adjacent magnetization pattern tracks and the direction of extension of one magnetization pattern track is opposed to the direction of extension of an adjacent magnetization pattern track, and FIG. 21D an example where a perpendicular anistropy film is used for the magnetic encoder of the invention. It will be obvious that these examples provide the same advantageous effects as those in the embodiment in FIG. 14.

In these embodiment, however, because the direction of magnetization within a single magnetization pattern track is identical, a magnetic flux leaking out of the magnetized portions a and c enters into the non-magnetized portion b as the reading unit becomes smaller. This leads to the result that a magnetic field applied to the MR in the non-magnetized portion b does not differ from that in the magnetized portion a and thereby there is no difference in output between the magnetized portions a and c and the non-magnetized portion b. Consequently, the requirement for higher resolution is unavoidably restricted.

Figure 22:
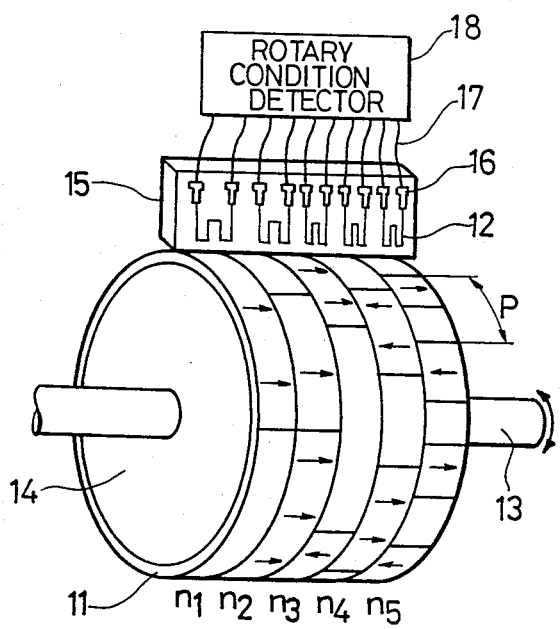
FIG. 22 is a perspective view of still another embodiment of an absolute type magnetic encoder in accordance with the present invention.
Figure 23:
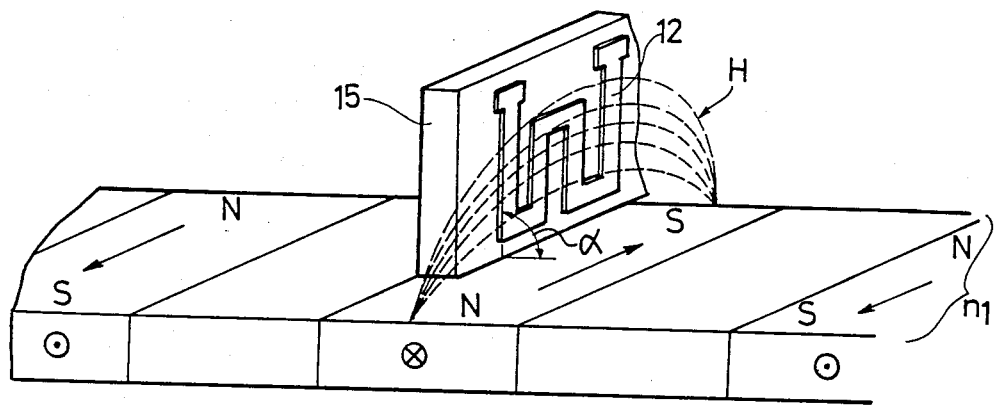
FIG. 23 is an enlarged fragmental perspective view of the magnetic encoder in FIG. 22, particularly illustrating that a leakage magnetic field H leaking out of a magnetization pattern intersects MR patterns at a right angle.
Figure 25:
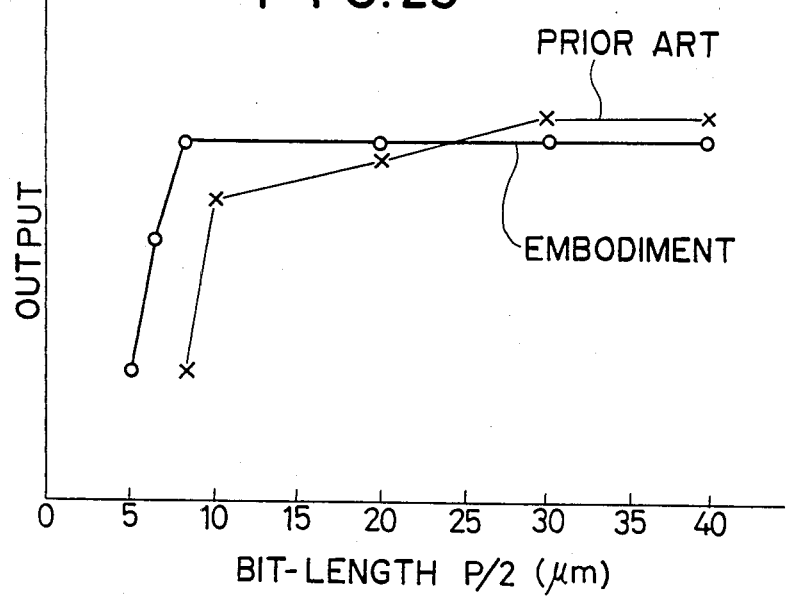
FIG. 25 is a diagram illustrating a comparison between the relationship between output voltage and bit-length p/2 with respect to the magnetic encoder in FIG. 22, and with respect to a conventional magnetic encoder.

The embodiment illustrated in FIGS. 22 and 25 23 has been practiced with the foregoing problem in mind. The magnetic encoder in accordance with the embodiment is so constructed that in a single magnetization pattern track the direction of magnetization of one magnetized portion is opposed to that of an adjacent magnetized portion with a non-magnetized portion interposed therebetween (see columns n3, n4 and n5).

Accordingly, the magnetic field on a nonmagnetized portion within a single magnetization pattern track becomes zero, and the output is not reduced even when pitch p is smaller. As a result, it is possible to satisfactorily meet the requirement for higher resolution.

Figure 24:
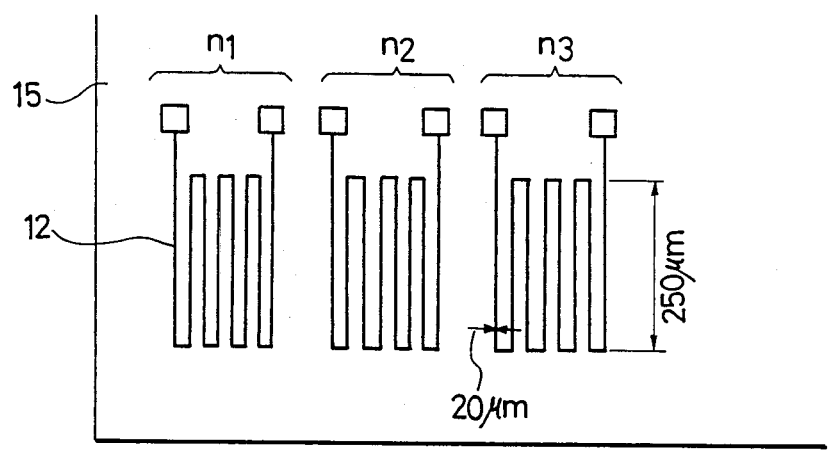
FIG. 24 is an enlarged view of MR 12 for the magnetic encoder in FIG. 22.

A drum 14 made of aluminum alloy having a diameter of 20 mm and a thickness of 8 mm with a film of Ba-ferrite having a thickness of 100 microns coated on the outer peripheral surface thereof was produced and a plurality of magnetization patterns having various bit-length p (a single track of magnetization pattern has a width of 300 microns) were formed with the use of a magnetizing head. Formation of a pattern having a width of 20 microns and a length of 250 microns as shown in FIG. 24 was repeated four times for the drum 14 and the relationship between the output voltage and combination of the drum 14 with MR 12 having an overall length of 1.2 mm. Incidentally, the ratio of the magnetizing portion to the non-magnetizing portion within the bit-length p was changed in the range of 0.2 to 0.8, so that their output time would become identical. Further, the sensor film had a thickness of 600 angstroms. As will be apparent from FIG. 25, it is possible to satisfactorily meet the requirement for a higher resolution because the magnetic encoder in accordance with this embodiment has an output voltage which is sufficiently above the noise level even when the bit-length is less than 10 microns which is indicative of the limit for a conventional magnetic encoder.

Figure 26:
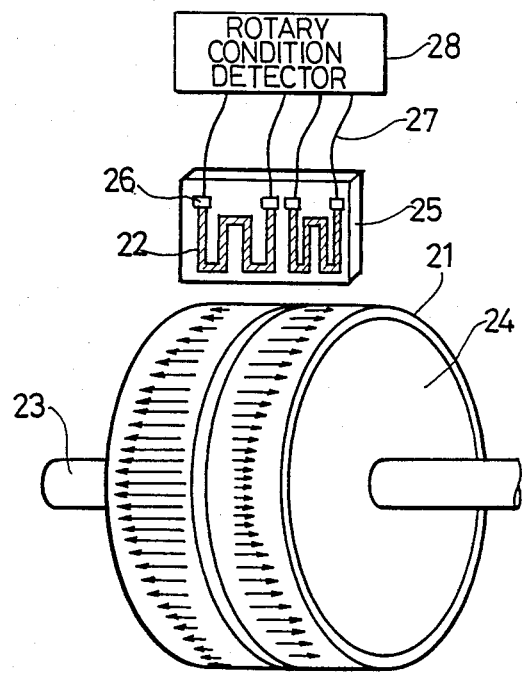
FIG. 26 is a perspective view of an analogue, and absolute type magnetic encoder in accordance with the present invention.
Figure 27:
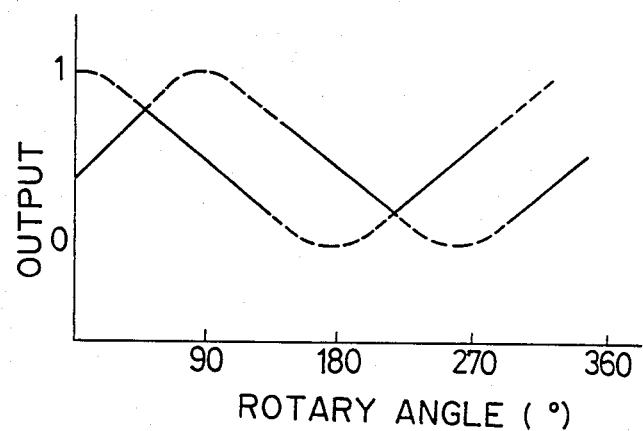
FIG. 27 is a diagram illustrating the wave shape of signals outputted from the magnetic encoder in FIG. 26.
Figure 28:
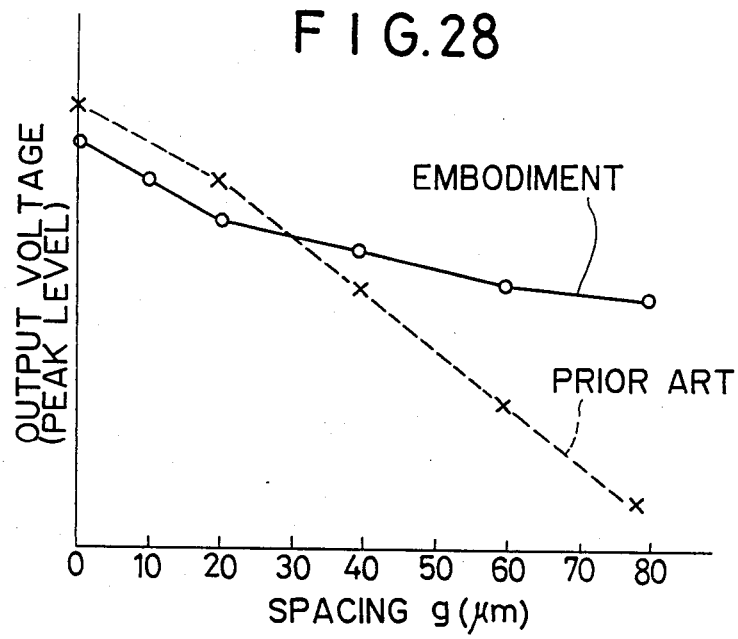
FIG. 28 is a diagram illustrating a comparison between the relationship between spacing and output voltage with respect to the magnetic encoder in FIG. 26, and with respect to a conventional magnetic encoder.

A magnetic encoder in accordance with other embodiment of the invention as illustrated in FIG. 26 is composed of a drum 24 made of aluminum alloy and fixedly mounted on a rotational shaft, a magnetic medium 21 of Co-γFe$_2$O$_3$ formed on the periphery of the drum 24, a detection head comprising an MR 22 formed by a film of 81Ni-Fe on a substrate 25 made of glass and a plurality of terminals 26 formed by a film of Cu, a plurality of leads 27 connected to the terminals 26 and a rotary condition detector 28. The longitudinal direction of the stripe of the MR 22 is oriented at a substantially right angle relative to the outer surface of the magnetic medium 21, while the lateral direction of the stripe is oriented parallel to the direction of magnetization pattern track of the magnetic medium 21. Referring to the drawing, the arrows shown on the magnetic medium 21 represent the intensity of magnetization, and magnetization has been effected with the use of a ring head. It should be noted that the intensity distribution of magnetization exhibits a triangular shape within a single magnetization pattern track and the difference in phase between the first track and the second track amounts to 90 degrees. In the magnetic encoder as constructed in the above-described manner, the resistance of the MR 22 varies in response to the intensity of the magnetic field leaking out of the magnetic medium 21 and thereby an output signal as shown in FIG. 27 was obtained. By discriminating a part of the output signal as represented by unbroken lines with the aid of a rotary condition detector 28 and then determining the magnitude of the aforesaid part, what position is assumed by the motor can be detected. Next, when the pattern of magnetization within a single magnetization pattern track is modified to the shape of a sine wave and an output signal is then observed, the substantially same wave apparent from FIG. 28, the magnetic encoder in accordance with the embodiment of the invention has less fluctuations in output voltage relative to the spacing between the MR element 22 and the magnetic medium 21 than that of a conventional magnetic encoder and is stable in operation.

Accordingly, it is required that the MR should be produced in a plane. Because there is no need to provide a magnetic medium having a curved contour, the magnetic encoder of the invention can be produced inexpensively. Further, since the magnetic encoder is constructed in the above-described manner, the output fluctuates little in response to fluctuations in spacing, resulting in the magnetic encoder being designed and constructed in a smaller size.

Figure 29:
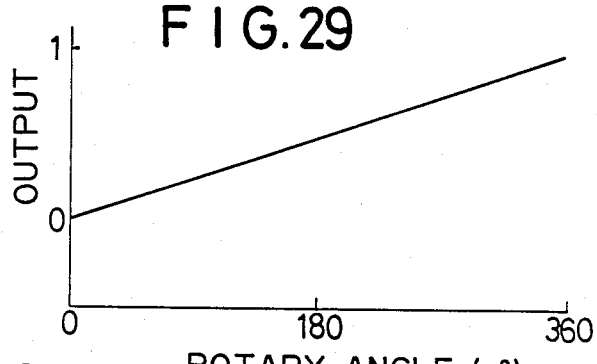
FIGS. 29 and 30 are diagrams illustrating the wave shape of signals outputted from the magnetic encoder in accordance with other embodiments of the present invention.
Figure 30:
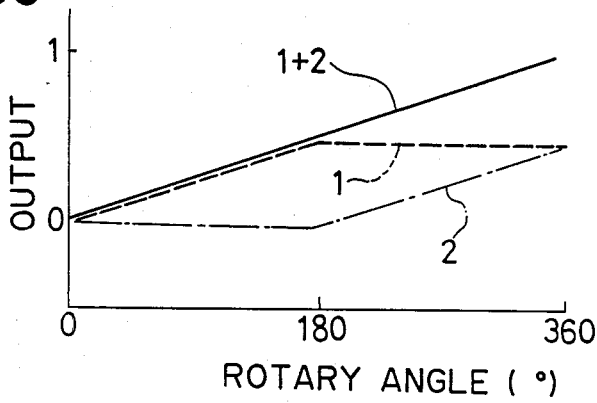

FIGS. 29 and 30 are diagrams illustrating intensity distribution of magnetization per one revolution of the drum with respect to a magnetic encoder in accordance with other embodiments of the present invention. FIG. 30 illustrates an example where a signal coming from two tracks of magnetization patterns on the disc is added and FIG. 29 an example where intensity of magnetization within one revolution of the disc is changed sequentially.

While the present invention has been described above with respect to several preferred embodiments thereof, it should of course be understood that it need not be limited only to them, but that various modifications and variations may be made in a suitable manner within the spirit and scope of the invention as defined by the appended claims.

What is claimed as new and desired to be secured by Letters Pat. of the U.S. is:

1. A magnetic encoder adapted to carry out output conversion, comprising:

a stripe shaped magneto-resistor;

a magnetic medium movable in a predetermined direction and located close to said magneto-resistor, said magnetic medium having at least one track of magnetization patterns recorded by a pitch p so as to generate a periodic magnetic field depending on the required position reading accuracy, said magnetic field coming out of said magnetic medium and having a direction perpendicular to the predetermined direction in which the magnetic medium is movable, wherein when a unit stripe length of said magneto-resistor is represented by l and the closest distance between the magnetic medium and the magneto-resistor is represented by g, the angle $\alpha$ defined between the longitudinal direction of the stripe and the surface of the magnetic medium located at the nearest part ranges from $$\tan^{-1}\left(\frac{2(l+g)}{p}\right)$$

to 90 degrees and the lateral direction of the stripe is oriented parallel to the direction of magnetic field from said magnetization patterns.

2. The magnetic encoder of claim 1, wherein the intensity of magnetization of the magnetic medium continuously varies within the range of a single pitch.

3. The magnetic encoder of claim 2, wherein the intensity distribution of magnetization of the magnetic medium within the range of a single pitch exhibits a sine wave shape.

4. The magnetic encoder of claim 2, wherein the intensity distribution of magnetization of the magnetic recording medium within the range of a single pitch exhibits a triangular wave shape.

5. The magnetic encoder of any one of claims 2 to 4 wherein within a single magnetization pattern track on the magnetic medium, adjacent patterns are magnetized in the same direction.

6. The magnetic encoder of any one of claims 2 to 4, wherein within a single magnetization pattern track on the magnetic recording medium, adjacent patterns are magnetized in opposite directions.

7. The absolute type magnetic encoder of claim 1, wherein the magnetization patterns existing within a single pitch comprise magnetized portions and nonmagnetized portions, at least two tracks of magnetization pattern are provided, the magneto-resistor is arranged corresponding to each of said magnetization pattern tracks so as to detect a magnetic field leaking from each of the magnetization pattern track, and the absolute position of a substrate on which the magnetic medium is placed is read out with the aid of a combination of the magnetization pattern track with the magneto-resistor.

8. The absolute type magnetic encoder of claim 7, wherein within a single magnetization pattern track, the direction of magnetization of a magnetized portion is opposed to the direction of magnetization of an adjacent magnetized portion with a nonmagnetized portion interposed therebetween.

9. The absolute type magnetic encoder of claim 7, wherein within a single magnetization pattern track, the direction of magnetization of a magnetized portion is oriented in the same direction as that of an adjacent magnetized portion with a non-magnetized portion interposed therebetween.

10. The absolute type magnetic encoder of any one of claims 2 to 4, wherein at least two tracks of magnetization pattern are provided, the magneto-resistor is arranged corresponding to each of said magnetization pattern track so as to detect a magnetic field leaking from each of the magnetization patterns, said angle is about 90 degrees, and the absolute position of a substrate on which the magnetic medium is placed is read out with the aid of a combination of the magnetization pattern track with the magneto-resistor.

* * * * *